United States Patent [19]

Burgin et al.

[11] Patent Number: 4,628,628
[45] Date of Patent: Dec. 16, 1986

[54] FISHING EQUIPMENT HOLDER

[76] Inventors: Carl T. Burgin, 438 Beacon Hill Dr., Longview, Wash. 98632; Gary A. Loomis, P.O. Box E, Woodland, Wash. 98674; Purl R. Enloe, deceased, late of Kelso, Wash.; by Shirley Enloe, administratrix, c/o Rte. 1, Box 200, Rainier, Oreg. 97048

[21] Appl. No.: 602,005

[22] Filed: Apr. 19, 1984

[51] Int. Cl.$^4$ .................. A01K 97/08; A01K 97/10
[52] U.S. Cl. .......................... 43/26; 43/21.2; 211/70; 206/315.11
[58] Field of Search ............ 43/54.1, 21.2, 26; 224/922, 916, 917, 251; 211/60.1, 68, 70.8, 70.2, 70, 62, 64, 65, 67, 69, 70.4, 70.6; 206/315.11

[56] References Cited

U.S. PATENT DOCUMENTS

| | | | |
|---|---|---|---|
| 350,523 | 10/1886 | Bodley | 211/70 X |
| 699,391 | 5/1902 | Johnson | 211/70.2 |
| 1,418,093 | 5/1922 | Parmater | 211/70.2 X |
| 2,028,694 | 1/1936 | Spinks | 211/87 |
| 2,211,278 | 8/1940 | Le Febvre | 248/45 |
| 2,628,445 | 2/1953 | Lawrenz | 43/21.2 |
| 2,704,412 | 3/1955 | Davis | 43/21.2 |
| 2,806,711 | 9/1957 | Jacobs | 211/70 X |
| 2,839,865 | 6/1958 | Lubanski | 43/26 |
| 2,899,769 | 9/1959 | Niles | 43/21.2 |
| 3,026,644 | 3/1962 | Raider | 43/19 |
| 3,515,263 | 6/1970 | Carlson | 206/16 |
| 3,629,966 | 12/1971 | Sanchez | 43/25 |
| 3,636,649 | 1/1972 | Palva | 43/21.1 |
| 3,659,369 | 5/1972 | Hermanson | 43/21.2 |
| 3,964,706 | 6/1976 | Adams | 43/21.2 |
| 3,966,051 | 6/1976 | Hollister | 211/14 |

Primary Examiner—Nicholas P. Godici
Assistant Examiner—Carmine Cuda
Attorney, Agent, or Firm—Christensen, O'Connor, Johnson & Kindness

[57] ABSTRACT

A fishing equipment holder (16) is composed of an elongate cylindrical body of a diameter large enough to receive and store various types of fishing tackle. Generally circularly shaped brackets (44a) and (44b) are spaced apart along and encompass body (18). A plurality of notches (48a, 50a, 52a, 54a) and (48b, 50b, 52b and 54b) are formed in the outer margins of brackets (44a) and (44b) respectively. A rigid, outer, split band (56) slidably rides within an outer groove (58) extending around the periphery of brackets (44a) and (44b) to extend across the openings of notches (48a–54a) and (48b–54b). The opening of outer band (56) may be aligned with the notches (48a–54a) and (48b–54b) to provide access to the notches when placing fishing equipment therein or removing fishing equipment therefrom. A resilient, inner, endless band (64) also extends around the periphery of brackets (44a) and (44b) at a location adjacent the inside surface of outer band (56) to urge fishing equipment within notches (48a–54a) and (48b–54b) outwardly against the outer band (56), thereby securely holding the equipment in place.

14 Claims, 4 Drawing Figures

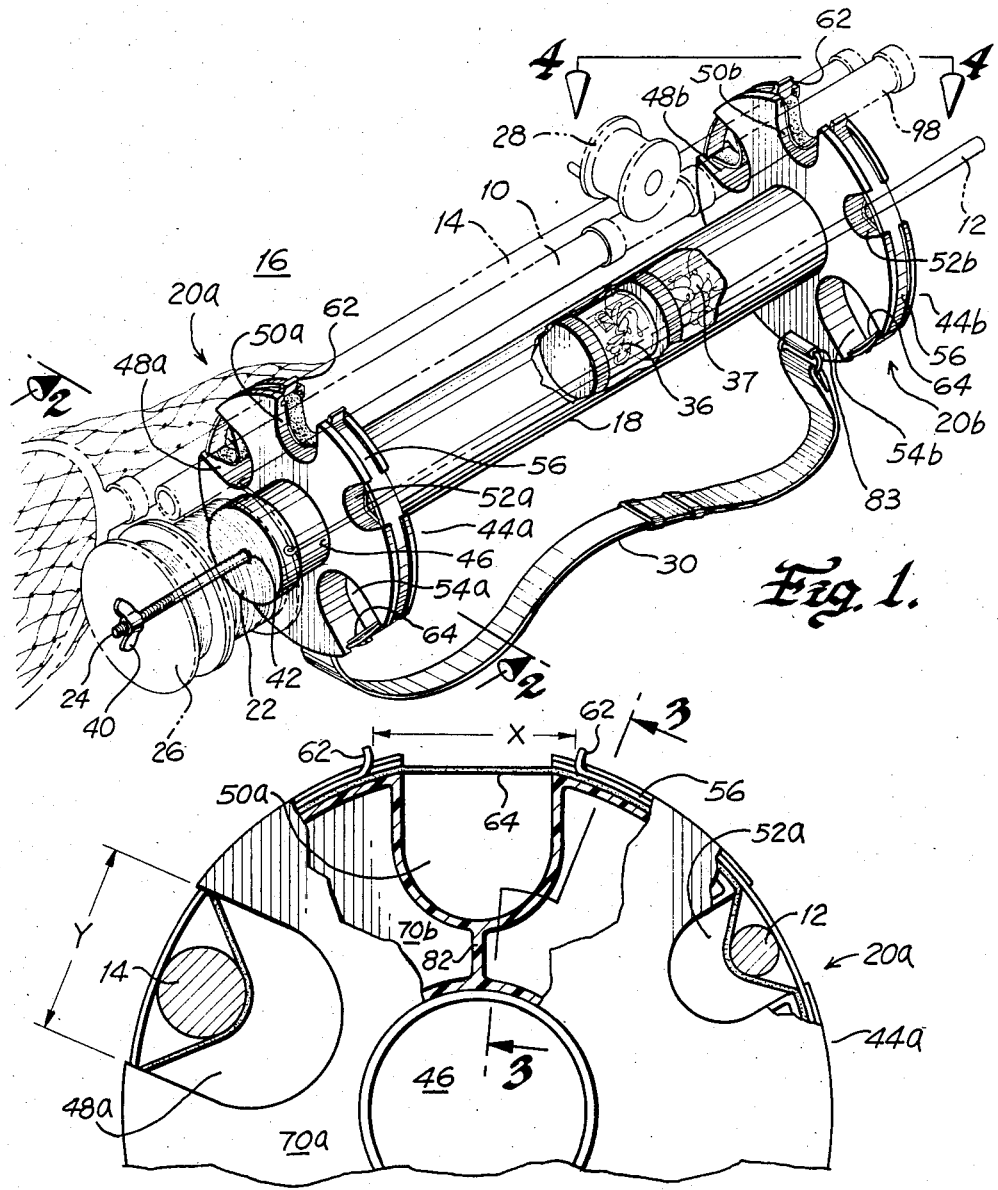
Fig. 1.
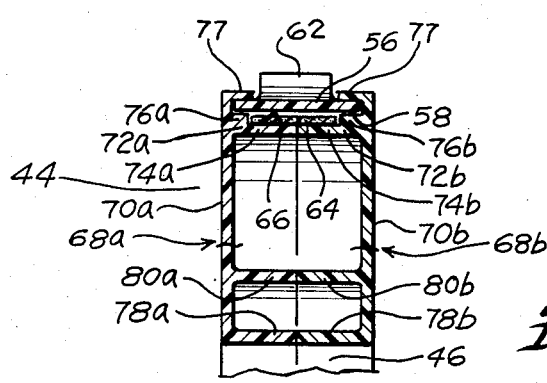
Fig. 2.
Fig. 3.

FISHING EQUIPMENT HOLDER

TECHNICAL FIELD

The present invention relates to fishing equipment and, more particularly, to a portable holder for holding fishing tackle in a convenient and organized fashion so that the tackle may be conveniently carried by a fisherman.

Sportsmen, while travelling to a desired fishing location, typically keep their bait, lures, hooks and other tackle in a tacklebox, but do not provide any particular or special protection for their fishing rods. Some fishermen, however, place their rods within a tubular container for protection during transporting of the rods. Examples of such containers are disclosed in U.S. Pat. Nos. 2,839,865 and 3,515,263. Such containers typically are only large enough to house the sections of the fishing rods. They cannot accommodate a reel or any additional fishing tackle. As a consequence, a separate container for this additional equipment is required.

When not in use, fishing equipment is typically kept in a closet, garage, basement or similar location. The tackle is stored in a tackle box, but the reels, rod sections, net, vest, boots and other larger equipment are stored in loose condition. Since all of the fishing equipment is not placed in a single container or physically secured together, individual items, such as the reel, rod, net or vest may become misplaced. Thus, an apparatus for maintaining of one's fishing equipment together as a single unit would be highly desirable.

For certain types of fishing, such as surf fishing, it is often desirable to have a device for supporting the fishing rod so that it does not have to be continually held by the fisherman. Various types of fishing rod supports have been developed, including those disclosed in U.S. Pats. Nos. 2,211,278; 2,899,769 and 3,636,649. Such devices, however, add an additional piece of equipment to that which already must be carried to the fishing site and stored when not in use. To eliminate the need for an additional piece of equipment, in the above-mentioned '865 and '263 U.S. patents the cylindrical fishing rod containers are constructed with a pointed lower end that is designed to be forced into the ground. It will be appreciated that the potential danger of a container with an exposed, pointed lower end is undesirable. Also, although the lower ends of the containers are pointed, the diameters of the containers are sufficiently large to make it difficult for fisherman to drive the containers into the ground, especially if the ground is at all hard.

Accordingly, it is a primary object of the present invention to provide a lightweight, portable fishing equipment holder for conveniently carrying and storing substantially all of the equipment needed for fishing, such as a plurality of fishing rods, reels, bait and fishing tackle, as a single, self-contained unit.

It is a particular object of the present invention to provide a fishing rod holder that protects fishing rods and tackle against damage during travel, for instance to and from a fishing site, and also during storage of the fishing equipment.

It is also a particular object of the present invention to provide a fishing equipment holder that is capable of conveniently and securely holding fishing rods of various sizes and other equipment on the exterior of a central body in which tackle or other items can be stored.

A further particular object of the present invention is to provide a fishing equipment holder that is convertible into a fishing rod support for supporting a fishing rod while fishing.

An additional particular object of the present invention is to provide a fishing equipment holder that not only is lightweight and durable, but also provides convenient and ready access to the fishing equipment.

SUMMARY OF THE INVENTION

The foregoing and other objects are achieved in accordance with the present invention through a portable fishing equipment holder constructed with a hollow, cylindrical body portion for receiving and storing fishing tackle and fastening assemblies for detachably securing a plurality of fishing rods or similar items to the holder. The fastening assemblies include a pair of circular brackets that are spaced apart from each other and encompass the cylindrical body of the holder. A plurality of notches are formed in the outer margins of the brackets and resilient retainers are employed to support fishing rods or similar items within the bracket notches. Ideally, the notches of the two brackets are disposed in registry with each other. Also, a split band slidably engages within a groove extending along the outer periphery of the brackets to enclose the bracket notches and retain fishing equipment within the bracket notches. The band has an opening that is selectively positionable in registry with a particular notch to provide access to the notch when securing fishing equipment on or removing fishing equipment from the holder. A second resilient band also extends along the outer periphery of the brackets at a location adjacent to the inner face of the outer band. The resilient band also extends across the opening of each notch in a manner similar to the outer band. The resilient band functions to urge the fishing rod or similar item outwardly against the outer band thereby securely holding the rod within a notch even though the thickness (diameter) of the rod may be significantly smaller than the size of the notch.

According to a further aspect of the present invention, a removable cap is engageable with one end portion of the holder body to provide access to the interior of the body. A spindle extends longitudinally outwardly from the cap for supporting a fishing line containing spool. A retainer is detachably engageable within the outward end portion of the spindle to retain the spool engaged over the spindle. With the fishing line spool mounted on the spindle, the line may be conveniently transferred from the spool to a fishing reel or vice versa.

In a further aspect of the present invention, an elongated spike is detachably engageable with the end portion of the body opposite the cap through the intermediacy of a plug, cap or similar member. The spike is formed with a pointed end that may be driven readily into the ground by striking a sliding collar against the holder bracket adjacent the spike. With the spike inserted into the ground to support the holder in an upright position, the handle end portion of a fishing rod may be placed within the holder body so that the holder serves as a fishing rod support.

BRIEF DESCRIPTION OF THE DRAWINGS

The details of a typical embodiment of the present invention will be described in connection with the accompanying drawings, in which:

FIG. 1 is an isometric view of a fishing equipment holder constructed according to the present invention illustrating various fishing equipment mounted thereon;

FIG. 2 is an enlarged, fragmentary plan view of one of the upper bracket 44a of the holder, with portions broken away for clarity and additional portions shown in cross section;

FIG. 3 is an enlarged, fragmentary cross-sectional view of the bracket illustrated in FIG. 2.

DETAILED DESCRIPTION

Figure 4:
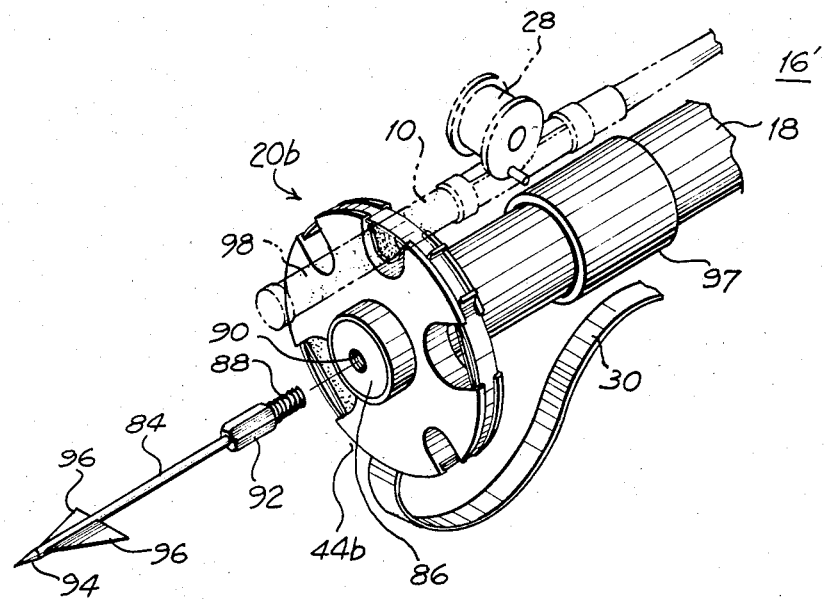
FIG. 4 is a fragmentary isometric view of a holder constructed similarly to that shown in FIG. 1, specifically illustrating the opposite end of the hold illustrated in FIG. 1 as being adapted to receive an elongate spike.

As illustrated in FIG. 1, fishing rod sections 10 and 12 and a net 14 are mounted on a portable fishing equipment holder 16 constructed according to the best mode of the present invention currently known to applicants. Holder 16 in basic form is constructed with an elongate, hollow body 18 and fastening assemblies 20a, 20b for detachably securing fishing rod sections 10 and 12, net 14 and similar fishing equipment to the holder. A cap 22, for closing off the upper end of body 18 (toward the left-hand shown in FIG. 1), is constructed with a spindle 24 for supporting a fishing line spool 26 for use in transferring fishing line between the spool and a reel, such as reel 28 mounted on rod section 10. Holder 16 also includes a flexible strip 30 anchored to fastening assemblies 20 to facilitate carrying the holder by a fisherman.

Continuing to refer specifically to FIG. 1, in a preferred embodiment of the present invention, body 18 is formed in the shape of a circular, tubular member that extends longitudinally beyond fastening assemblies 20a and 20b. The right-hand end portion of body 18, FIG. 1, is closed off by a cap or plug, not shown, that may be either permanently secured to the body or detachably secured thereto. Preferably, the inside diameter of body 18 is of sufficient size to receive individual containers, such as circular containers 32 and 34, which may house hooks 36, weights 37, lures (not shown), bait (not shown) and other types of fishing tackle. To accommodate such containers the inside diameter of body 18 is ideally at least two inches. Also, preferably, body 18 is constructed from plastic, aluminum or comparable material that is lightweight, corrosion resistant and of sufficient structural integrity to safely carry fishing rods and associated equipment. Although body 18 is illustrated as being cylindrical, it can be constructed in other cross-sectional shapes, such as square, hexagonal or octagonal without departing from the spirit or scope of the present invention.

The left-hand end or upper end portion of body 18, shown in FIG. 1, is covered with a cap 22. The cap may be secured to body 18 by any convenient means, such as by snuggly engaging over the end of the body, or by being threaded to engage with corresponding threads (not shown), formed about the adjacent end of the body. An elongate spindle 24 extends longitudinally outwardly from the center of cap 22 to engage within the central opening of a fishing line spool 26, thereby to support the spool. A wing nut 40 or similar fastener is threadably engageable with the threaded free end portion of spindle 24 to retain spool 26. A spring, not shown, or other resilient member may be interposed between wing nut 40 and the adjacent end of spool 26 to place a desired preload on the spool to prevent it from free wheeling about spindle 24. It will be appreciated that by the construction of cap 22 and spindle 24, a fisherman may conveniently transfer fishing line from spool 26 and a reel, such as reel 28, or vise versa.

Spindle 24 may be permanently attached to cap 22, or instead it may be removably engaged therewith, for instance, by forming the cap with a threaded central hole 42 and threading the adjacent end of the spindle. The spindle may be constructed with a pair of flats, not shown, or an enlarged hexagonal shank portion (not shown), to enable the fisherman to securely grasp the spindle either with his fingers or with a wrench, not shown, for loosening or tightening the spindle relative to cap 22.

Additionally, referring to FIGS. 2 and 3, holder 16 includes two fastening assemblies 20a and 20b spaced from each other along body 18 for detachably securing fishing rod sections 10 and 12, net 14 and similar items to the outside of the holder. Preferably, fastening assemblies 20a and 20b are similar in construction and spaced slightly inwardly from the adjacent end portions of body 18. The fastening assemblies includes generally circular, discshaped flange or bracket 44a and 44b respectively that encompasses, is fixedly attached to and extends outwardly from body 18. Brackets 44a and 44b include a central opening 46 for engaging over body 18. A plurality of various sized notches, such as notches 48a, 50a, 52a and 54a are spaced about the periphery of bracket 44a and corresponding notches 48b, 50b, 52b and 54b are spaced about the periphery of bracket 44b. Each of the notches is generally U-shaped with an opening in the radially outwardly direction. As shown in FIGS. 1 and 2, notches 48a, 48b, 50a, 50b, 52a, 52b, 54a and 54b are of different widths and depths to accommodate different sized fishing equipment. Also, corresponding notches, for instance 50a and 50b, may be of different widths and depths to reflect the fact that the sections of a rod, for instance rod section 10, is tapered. Accordingly, ideally the width and depth of notch 50b is greater than the width and depth of notch 50a.

Fastening assemblies 20a and 20b also include a thin, circular, split band 56 that is slidably engaged within an outer groove 58 extending around the outer periphery or end portion of brackets 44a and 44b. Band 56 extends across the openings of notches 48a-54a and 48b-54b to retain fishing equipment within the notches. As most clearly illustrated in FIG. 3, outer groove 58 is partially closed by lips 77 to define an opening, which opening is narrower than the width of band 56 to retain the band within outer groove 58. The ends of band 56 as defined by flange portions 62, extend outwardly through the groove opening a sufficient distance to be conveniently manually graspable by the fisherman when desiring to rotate band 56 about brackets 44a and 48b. Flange portions 62 are narrower in width than the width of the band per se to enable the flange portions to provide clearance relative to lips 77. Preferably, the distance "x" extending along the outer periphery of brackets 44a and 44b that separates flange portions 62 from each other is slightly larger than the width "y" of the largest notch 48a-54a and 48b-54b to avoid obstructing any of the notches when the opening of the band is aligned therewith. It will be appreciated that a fisherman may conveniently grasp flange portions 62 to rotate band 56 about corresponding brackets 44a and 48b to align the opening of the band with various notches 48a-54a and 48b-54b to provide access to the notches when desiring to place fishing equipment into or removing the equipment from the notches. Except when the opening of band 56 is aligned with a particular notch, the band extends across all of the notches, thereby maintaining fishing equipment engaged within the notches.

Fastening assemblies 20a and 20b further include a resilient, endless band 64 extending around the periphery of brackets 44a and 44b closely adjacent the inside surface of band 56. As most clearly shown in FIG. 3, resilient band 64 is disposed within a shallow inner groove 66 formed in the periphery of brackets 44a and 44b at a location radially inwardly of outer groove 58 thereby to space the resilient band slightly inwardly of band 56 to avoid contact with band 56 and thus chafing it there against. The resilient band 66, extending across each notch 48a–54a and 48b–54b, preferably is formed from material that is sufficiently elastic to permit the band to deform inwardly to accommodate fishing equipment while urging the equipment outwardly against band 56, FIG. 2. As a consequence, the fishing equipment is securely held within notches 48a–54a and 48b–54b (between outer band 56 and resilient band 64) even though the equipment is of a size smaller than the diameter of the notches.

Although brackets 44a and 44b may be constructed from solid material that has been milled to form outer groove 58 and inner groove 66, ideally the brackets are substantially hollow in construction with appropriate wall sections to define the exterior surfaces of the brackets. Referring specifically to FIGS. 2 and 3, ideally brackets 44a and 44b are composed of two similar, generally circularly shaped halves 68a and 68b that together define the bracket. Each half 68a and 68b is composed of a generally planar, circular outer surface 70a and 70b and a stepped sidewall 72a and 72b extending around the circular periphery of outer surfaces 70a and 70b. Sidewalls 72a and 72b include inner walls 74a and 74b that together define the base of inner groove 66 and shoulder portions 76a and 76b that define the sidewalls of the inner groove 66 and the base of outer groove 58. Lips 77 are spaced radially outwardly from shoulder portions 76a and 76b to define the opening of outer groove 58. Central circular walls 78a and 78b cooperatively define central opening 46 of brackets 44a and 44b. Notch 50a, shown in FIGS. 2 and 3, is defined by generally U-shaped walls 80a and 80b that extend transversely inwardly towards each other from stepped walls 72a and 72b. The other notches 48a, 52a, 54a and 48b–54b are similarly constructed. Also, a rib 82 extends radially inwardly from the arcuate base portion of the U-shaped walls 80a and 80b to intersect center walls 78a and 78b, respectively. It will be appreciated that brackets 44a and 44b, are formed by intersecting the two bracket halves 68a and 68b along the adjacent edges of stepped walls 74a and 74b, U-shaped walls 80a and 80b, rib 82 and center walls 78a and 78b. The two halves of the bracket may be interconnected by any convenient means, such as by use of an adhesive or appropriate hardware. it will be appreciated that by this construction, brackets 44a and 44b are not only of lightweight and durable construction, but also may be advantageously economically produced by automated techniques, such as by a high speed, injection molding process.

As shown in FIG. 1, holder 16 also includes a flexible length adjustable strap 30 that is secured to brackets 44a and 44b by use of an appropriate fastening anchor 83 that is commonly used for such purposes. Strap 30 permits the holder to be conveniently carried over the shoulder of the fisherman, if desired, thereby leaving the hands free to carry other objects. Also, between fishing trips, when holder 16 is being used to store fishing equipment, a strap 30 may be conveniently placed around a hook, spike or other object.

In an alternative embodiment 16' of the present invention illustrated in FIG. 4, an elongate spike 84 is detachably engaged with a plug 86 or similar member secured to the end of holder 16' opposite cap 22 (not shown). Spike 84 is constructed with a threaded shank portion 88 that threadably engages within a central threaded opening 90 formed in plug 86. Spike 84 is formed with an enlarged hexagonal portion 92 adjacent threaded portion 88 that may be conveniently gripped by the fingers of the fisherman or by a wrench for tightening or loosening a spike relative to plug 86. The free end 94 of spike 84 is pointed to facilitate driving the spike into the ground. Also, fins 96 may be provided to prevent the spike from rotating in the ground. When the spike is not in use, it can be stored within body 18 or instead it can be carried on the exterior of holder 16 by fastening assemblies 20a and 20b in the manner of the other fishing equipment, such as rod sections 10 and 12 or net 14.

Holder 16' also includes a sliding collar 97 that encircles body 18. The inside diameter of collar 97 is slightly larger than the outside diameter of body 18 to enable a fisherman to slide the collar along the body and strike against the lower bracket 44b to drive spike 84 conveniently into the ground. Thereafter, the handle portion 98 of a fishing rod, such as rod 10, is placed within holder 16' in a manner similar to that shown in the above-mentioned '278 and '263 U.S. patents so that the rod is supported by the holder, thereby relieving the fisherman of having to constantly hold the rod.

It is to be understood that collar 97 also can be advantageously employed to remove spike 84 from the ground. Collar 97 can be conveniently slid upwardly along body 18 to strike against the upper bracket 44a thereby removing spike 84 from the ground.

It will be appreciated that the holders 16 and 16' of the present invention enable a fisherman to store all of his fishing gear in a single, compact unit so that it is always ready for use. The fisherman no longer must search for his rod, reel, tackle box, etc., before setting off for a fishing trip. In addition, the holder protects the fishing equipment during travel and leaves the hands free for riding a motorcycle or bicycle or for hiking to a stream or lake.

As will be apparent to those skilled in the art to which the invention is addressed, the present invention may be embodied in forms other than those specifically disclosed above without departing from the spirit or essential characteristics of the invention. The particular embodiments of holder 16 and 16', described above, is therefore to be considered in all respects as illustrative and not restrictive. The scope of the present invention is as set forth in the appended claims, rather than being limited to the examples of holder 16 and 16' set forth in the foregoing description.

The embodiments of the invention in which an exclusive property or privilege is defined are claimed as follows:

1. A portable fishing equipment holder, comprising:
an elongate body portion; and,
fastening means for detachably fastening a plurality of fishing rods or similar items to the exterior of said body portion, said fastening means comprising:

(a) a plurality of brackets encompassing said body portion and extending outwardly therefrom;

(b) a plurality of notches formed in the outer margins of each bracket; and, (c) a separate outer band means employed in conjunction with each bracket for resiliently retaining a fishing rod or similar item within said notches, said outer band means substantially encircling and frictionally engaging with the outer peripheral portion of said bracket, having end portions defining a gap slightly wider than the width of the widest of said notches, and being normally frictionally held in a selected angular position but being manually rotatable relative to said bracket to provide selective access only to one notch at a time.

2. The fishing equipment holder according to claim 1, wherein said body portion is hollow and of sufficient size to receive fishing tackle.

3. The fishing equipment holder according to claim 2, wherein said body portion is tubular.

4. The fishing equipment holder according to claim 1, wherein said brackets are spaced apart from each other along said body portion.

5. The fishing equipment holder according to claim 4, wherein said notches of said brackets being disposed in registry with each other.

6. The fishing equipment holder according to claim 1, wherein said fastening means further includes resilient urging means for urging a fishing rod or similar item outwardly against said outer band means.

7. The fishing equipment holder according to claim 6, wherein said resilient urging means include an elastic band encircling a corresponding bracket at a location inwardly along the perimeter of said bracket relative to the location of said outer band means.

8. The fishing equipment holder according to claim 1, further including elongated spike means and fastening means for detachably fastening said spike means to one end portion of said body portion.

9. The fishing equipment holder according to claim 8, further comprising a collar means slidably engaged over said elongate body portion.

10. The fishing equipment holder according to claim 1, further including a spindle extending outwardly from one end portion of said body portion and a retainer member detachably engageable with the spindle.

11. The fishing equipment holder according to claim 10, wherein the end portion of said spindle opposite said body portion being threaded to engage with said retainer member.

12. A portable fishing equipment holder, comprising:
(a) an elongate body portion;

(b) fastening means for detachably fastening a plurality of fishing rods or similar items to the exterior of said body portion, said fastening means comprising:
  (i) a plurality of brackets encompassing said body portion, extending outwardly therefrom, and spaced apart from each other along said body portion;
  (ii) a plurality of notches formed in the outer margins of said brackets;
  (iii) means for resiliently retaining a fishing rod or similar item within said notches, comprising outer band means extending along the periphery of said brackets to selectively extend across the openings of said notches, said outer band being movable along the periphery of said brackets and including an opening selectively registrable with a notch to provide access into said notch; and,
  (iv) resilient urging means for urging a fishing rod or similar item outwardly against said outer band means; and, (c) wherein said outer band means rides within a groove extending along the periphery of said bracket and said resilient urging means including an elastic inner band interposed between the periphery of said bracket and said outer band means.

13. A portable holder for holding fishing equipment, comprising an elongate body portion; and fastening means for detachably fastening a plurality of fishing rods or similar items to the exterior of said body portion, said fastening means comprising:

(a) a pair of brackets spaced apart along, encompassing, and extending outwardly from said body portion;

(b) a plurality of aligned notches formed in the outer margins of said brackets to receive the fishing rods or other items therein;

(c) outer band means disposed along the periphery of said brackets to substantially encircle said brackets, said band means: having end portions defining a gap of a width slightly wider than the width of the widest notch; and, being slidable along said brackets to selectively provide access to only one set of aligned notches at a time;

(d) wherein said notches having portions retaining said outer band means in engagement with the outer periphery of said brackets while permitting said outer band means to slide along said brackets; and, (e) resilient urging means for urging a fishing rod or similar item disposed with said aligned set of notches outwardly against said outer band means.

14. The portable fishing equipment holder according to claim 13, wherein said resilient urging means includes inner band means extending along the periphery of said brackets inwardly of said outer band means.

* * * * *

UNITED STATES PATENT AND TRADEMARK OFFICE
CERTIFICATE OF CORRECTION

PATENT NO. : 4,628,628

DATED : December 16, 1986

INVENTOR(S) : Carl T. Burgin et al.

It is certified that error appears in the above-identified patent and that said Letters Patent is hereby corrected as shown below:

Column 3, line 27, "strip" should be --strap--.

Column 4, line 14, after "spaced" insert -- apart --.

Column 4, line 21, "discshaped" should be -- disc-shaped --.

Column 8, line 14, after "band" insert -- means --.

Signed and Sealed this

Twenty-seventh Day of October, 1987

Attest:

DONALD J. QUIGG

*Attesting Officer*  *Commissioner of Patents and Trademarks*